UNITED STATES PATENT OFFICE.

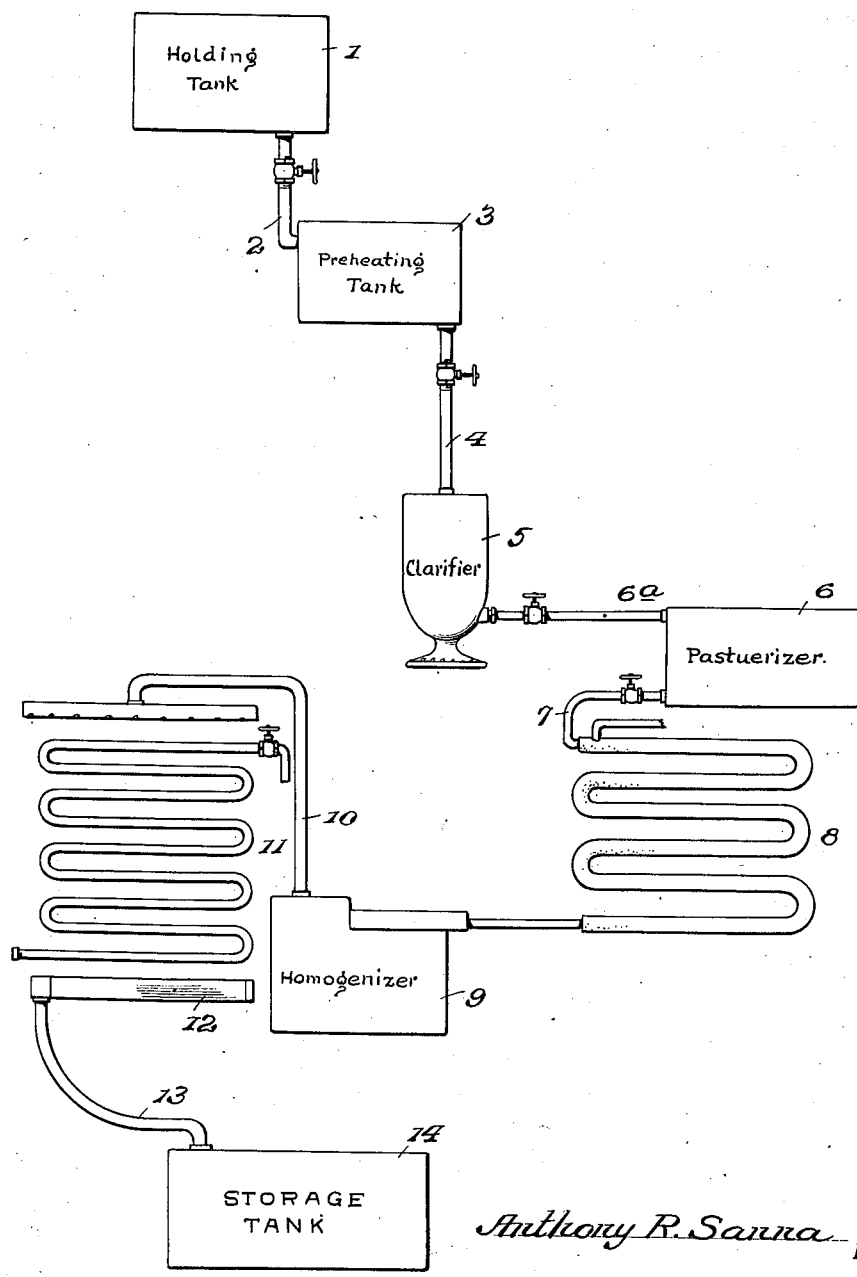

ANTHONY R. SANNA, OF CHEVY CHASE, MARYLAND, ASSIGNOR TO GEORGE P. SACKS, OF BRADLEY HILLS, MARYLAND.

METHOD OF CLARIFYING ICE-CREAM MIX.

1,414,215.            Specification of Letters Patent.     Patented Apr. 25, 1922.

Application filed October 23, 1920, Serial No. 419,033. Renewed December 5, 1921. Serial No. 520,156.

*To all whom it may concern:*

Be it known that I, ANTHONY R. SANNA, a citizen of the United States, residing at Chevy Chase, in the county of Montgomery and State of Maryland, have invented certain new and useful Improvements in Methods of Clarifying Ice-Cream Mix, of which the following is a specification.

This invention relates to a process of preparing a mixture of materials, such for example that commercially known as an ice cream mix, in that said mixture is subjected to a clarifying operation without the material loss of any of the necessary or desirable ingredients in such mix.

A mixture of this character will ordinarily contain a certain amount of butter fat in the form of cream, milk solids, sugar solids, and the like, and with these solids present in the mix it has heretofore been impossible to clarify the mixture without a material loss of such solids. Cream mix as ordinarily handled in the manufacture of ice cream, necessarily contains more or less foreign matter, which it is highly desirable, though heretofore thought impossible to eliminate. For example the sugar added to the mix will, incident to its transportation and character of container, necessarily deliver into the mix some foreign particles which are not only undesirable as units, but are productive of detrimental bacteria. Likewise the dairy products, no matter how clarified in their original condition, acquire foreign particles in transportation and handling. These foreign particles are present in suspension, but this is also the fact as to the desirable solids in the mix, and for this reason it has heretofore proven impossible to clarify the mix and remove the foreign particles, without also removing a corresponding proportion of the solids held in suspension, which it is desirable and necessary to retain in the mix.

My present invention is directed more particularly to the preparation and handling of the mix to permit of its being clarified through the removal of substantially all the foreign particles, without correspondingly removing any substantial proportion of those ingredients desirable and essential in the mix. Experiments have demonstrated that there is an undesirable and excessive proportion of foreign particles in an ice cream mix as now used in ice cream, and this to such an extent that following a proper clarification of such mix, the resultant product produced by my improved process is a material and noticeable improvement over the product of the mix without clarification.

As previously stated, the mix contains butter fat in the form of cream, milk solids, fluid milk either whole or skimmed, sugar solids in the form of cane sugar, refiners' syrup or other sweetening medium, and in carrying out the process forming this invention, this mix is subjected to a temperature which may vary from 110° to 160° F., or even higher. The purpose and substantial result of this heating of the mix is to convert the solids held in suspension, other of course than the foreign particles ordinarily insoluble, and retain such solids in the mix in solution. The mix then substantially in solution is directed to a clarifier, and through the action of the clarifier, those particles held in suspension, that is the foreign particles, and possibly an extremely small proportion of the desirable solids are separated. The clarified mix is then directed to a pasteurizer, and then through what is known as an internal tubular cooler in which the temperature of the mix is allowed to gradually drop to a temperature varying from 85° to 120° F., considered the best homogenizing temperature, the mix at this temperature being homogenized in the usual manner. Following the emulsification of the mix it is directed to an open or closed cooler for the final cooling, holding, ripening, etc. Thereafter the mix can be handled in the usual way for the production of the final product.

To illustrate the manner in which the process may be carried out, reference is made to the accompanying drawing, wherein I have illustrated diagrammatically the various machines employed in making ice cream.

In the drawing, 1 indicates a tank for holding the milk, 2 a pipe leading therefrom to a preheating tank 3, provided with suitable means to preheat the milk. A pipe 4, leads from the preheating tank to a clarifier 5, which may be of any approved type. The mix is conveyed from the clarifier to a pasteurizer 6, through a pipe 6ª. From the pasteurizer extends a pipe 7, connected to a preliminary cooling coil 8, the opposite end of the coil being connected to a homogenizer 9. A pipe 10, extends from the homogenizer to the upper portion of cooling and aerating coil 11, at the bottom of which is a trough 12, from which leads a pipe 13, connected with a storage or aging tank 14.

Milk is conveyed from the holding tank to the preheating tank where the necessary ingredients are introduced to form a mix. The mix is now heated to a temperature approximating 150° F. or 160° F., more or less depending upon the character and age of the milk. The temperature is gauged and the milk tested to insure of the soluble ingredients being dissolved so that in the following step in the process the foreign matter will be effectually removed. After the mix is preheated to the desired extent, it is conveyed through pipe 4, to a clarifier. The mix passes through the clarifier while in a heated condition to insure of maintaining the soluble constituents in a fluid state; the insoluble particles being held in suspension in the agitated mix. The clarifier acts to remove the insoluble constituents, and the lumps or other substances which have not been reduced to a fluid form by the preheating step. From the clarifier the mix is conveyed through the preliminary cooling coils 8, to the homogenizer 9. As the mix passes through the cooling coils the temperature is reduced to a desirable homogenizing temperature to insure of proper homogenizing conditions. In other words the reduced temperature apparently tends to permit of certain of the constituents in the mix to assume more of a natural globular form, hence, when these constituents are acted on by the incident pressure and force of the homogenizing action, a more effective emulsification of the mix takes place.

The mix is carried from the homogenizer through the pipe 10, to the cooling coils 11, where it is aerated and further cooled, and is eventually trapped in the trough 12. By the time the mix reaches the trough its temperature is reduced to approximately 32° F. to 34° F., and is now in condition to be stored and aged in the tank 14, for future use.

As the various machines conventionally shown and described are of well known type no attempt has been made to illustrate or describe the details, and it is therefore to be understood that the necessary valves, pumps and other essentials necessary to practically operate the system are to be as included in the diagrammatic showing.

The essential step in this process, as herein described is that of preheating the mix to thereby uniformly distribute and dissolve all soluble substances so as to bring the mix as nearly to a liquid condition as possible. The action of the clarifier will therefore act only upon those materials, principally foreign particles which are held in the mix in suspension, and hence the clarifying action will be effective in entirely removing such foreign particles, to the obvious betterment of the final product.

For the purpose of this application, and as at present known to me, the essential step of the improved method is that of converting the mix substantially into a liquid with the desirable materials in solution rather than in suspension, leaving the foreign particles which are to be removed in suspension, and while this step as herein defined is gained through a proper heating of the mix, it is to be understood that the invention is in no wise to be limited in such specific step, but rather that such step of the present process is to be defined as to so treat the mix as to convert the desirable solids in suspension into solution, and any means mechanical or chemical by which this conversion may be carried out, is to be considered as within the scope of the invention as defined in the appended claims. For example, it may be entirely possible and probable to convert the various constituents of the mix into a substantial solution prior to their addition to form the mix, in which case the mix as a whole, outside of the foreign particles will be in solution, and when subjected to the clarifying operation, the desirable constituents of the mix will not be removed in any considerable proportion. Characteristically, therefore the important step in the invention as described, is the clarification of the mix without removing any substantial proportion of the desirable constituents, and as such as heretofore proven impossible I consider it broadly within the scope of my invention to clarify an ice cream mix for the separation of the foreign particles, without the separation of the desirable constituents.

In carrying out the process of clarification in actual practice, from 20 to 24 pounds of foreign substance has been taken from an average of 2,000 gallons of mix. This substance accumulates in the refuse chamber of the clarifier, and becomes wholly separated from the mix, and is thrown away as waste. Analysis shows that the refuse contains dust and particles from the farm, hairs from animals, and other objectional substances, most of which doubtless come with the milk from the rural store houses, notwithstanding the fact that the milk as such was previously clarified. In addition to these substances, the refuse contains foreign particles incident to sugar and other ingredients employed in the mix. Above all, and a factor which is highly important to pure ice cream is the removal of a sluggish "blackish" pasty mass of refuse which contains detrimental bacteria, and the constituents which cultivate same.

In some instances the percentage of refuse in proportion to the volume of milk has been much higher, while in other instances it has been less. In any event the process, now in successful operation, proves conclusively that ice cream as now made and sold under the best known sanitary methods contains a large percentage of foul and foreign substances which unquestionably is detrimental to the health of those eating the cream.

As previously indicated it has heretofore been thought to be impossible to clarify ice cream mix, and it has been likewise appreciated that the mixture of the various constituents with the milk, was but the basis for the cultivation of harmful bacteria. It has also been appreciated that by reason of the chemical nature of the various ingredients employed with the milk to make the mix, certain chemical reactions would likely occur and possibly produce harmful effects, particularly in view of the inherent impurities in the constituents together with the incident foreign substances mixed and carried with such constituents.

My improved method has successfully proven that the conditions noted can be met and overcome and instead of permitting of the retention of such substances they can be entirely eliminated without in any wise effecting the removal of the essential solids, the final product being superior to the now known product as it is entirely free of detrimental foreign substances.

I have also discovered that by removing the foreign particles from the mix, and the subsequent preliminary gradual cooling of the clarified and pasteurized product, the resultant fluid is rendered more susceptible to the homogenizing action. The elimination of the foreign particles apparently leaves space for the various globules to be thrust with greater force against the spreading or breaking up surface of the homogenizer, which results in a smooth and uniform emulsified body. This action, together with the effectual removal of the insoluble foreign substances produces a high grade, smooth, delicious and healthful ice cream, free of grit and dirt.

Fundamentally I make the mix and preheat same before pasteurization, and thereby remove the foreign particles before same are "cooked" in the pasteurization step.

What I claim is:—

1. That step in the manufacture of ice cream consisting in removing the foreign particles from the mix by mechanical clarification without removing any substantial proportion of the desirable constituents.

2. The herein described process consisting in treating an ice cream mix to permit of its mechanical clarification for the removal of foreign particles without a corresponding removal of any appreciable proportion of the desirable constituents of the mix.

3. The herein described process consisting in treating an ice cream mix to bring the desirable constituents to a condition beyond the effect of a mechanical clarifier, while permitting the foreign particles to remain in a condition to be removed by such clarifier, and thereafter subject the mix to a mechanical clarifier to remove foreign particles from said mix.

4. The herein described process consisting in subjecting an ice cream mix to heat to change the condition of the desirable constituents from suspension to solution, and subjecting the mix to an action of the clarifier to remove foreign particles.

5. The herein described process of removing foreign substances from ice cream, consisting in making up what is known as a "mix," then treating the mix to a clarification action together with heat to dissolve the soluble constituents and remove the insoluble constituents in the mix, and subsequently freezing the product.

6. The herein described process of removing foreign substances from ice cream, consisting in making up what is known as a "mix," then treating the mix to a clarification action together with heat to dissolve the soluble constituents and remove the insoluble constituents in the mix, subsequently gradually reducing the temperature of the mix, thereafter homogenize the mix, and finally freezing the mix.

7. The herein described process of removing foreign substances from ice cream, consisting in making up what is known as a "mix" then treating the mix to a clarification action together with heat to dissolve the soluble constituents and remove the insoluble constituents in the mix, subsequently pasteurizing the mix, then gradually reducing the temperature and homogenizing the mix, then again gradually reducing the temperature of the mix, and finally freezing the mix.

8. The herein described process of making ice cream consisting in making what is known as a "mix" including heating and clarifying the mix to remove foreign insoluble particles therefrom, subsequently gradually reducing the temperature of the mix, and finally freezing the mix.

In testimony whereof I affix my signature.

ANTHONY R. SANNA.